United States Patent [19]

Suita et al.

[11] Patent Number: 5,798,919

[45] Date of Patent: Aug. 25, 1998

[54] SYSTEM FOR AND METHOD OF EQUIVALENT CIRCUIT REFERENCE TYPE CONTROL

[75] Inventors: Kazutsugu Suita, Toyota; Yoji Yamada, Nagoya; Nuio Tsuchida, Nagoya; Koji Imai, Nagoya, all of Japan

[73] Assignees: Toyota Jidosha Kabushiki Kaisha; Toyota School Foundation, both of Japan

[21] Appl. No.: 610,861

[22] Filed: Mar. 5, 1996

[30] Foreign Application Priority Data

Mar. 9, 1995 [JP] Japan ................................ 7-049945

[51] Int. Cl.$^6$ ........................ G05B 13/04; G05B 17/02; G05B 23/02
[52] U.S. Cl. ........................ 364/150; 364/483; 364/578; 364/151; 388/815; 388/912
[58] Field of Search ........................ 364/578, 483, 364/150–153, 149, 160, 161; 318/561, 571, 603, 638; 341/164, 166; 388/815, 912; 377/20; 327/104

[56] References Cited

U.S. PATENT DOCUMENTS

| | | | |
|---|---|---|---|
| 3,705,978 | 12/1972 | De Schamphelaere | 364/139 |
| 3,754,183 | 8/1973 | Ibamoto et al. | 361/20 |
| 4,282,570 | 8/1981 | Kurosawa et al. | 363/87 |
| 5,148,514 | 9/1992 | Arima et al. | 364/807 |
| 5,263,113 | 11/1993 | Naitoh et al. | 388/815 |
| 5,293,457 | 3/1994 | Arima et al. | 395/24 |
| 5,305,652 | 4/1994 | Zimmer | 74/490.01 |
| 5,317,525 | 5/1994 | Taoka et al. | 364/578 |
| 5,375,448 | 12/1994 | Katayama et al. | 364/149 |
| 5,535,418 | 7/1996 | Suzuki | 395/845 |

FOREIGN PATENT DOCUMENTS

| | | |
|---|---|---|
| 0 088 539 | 9/1983 | European Pat. Off. . |
| 0 251 514 | 1/1988 | European Pat. Off. . |
| 0 401 816 | 12/1990 | European Pat. Off. . |
| 0 404 962 | 1/1991 | European Pat. Off. . |
| 0 573 357 | 12/1993 | European Pat. Off. . |
| 0 639 888 | 2/1995 | European Pat. Off. . |
| 58-219614 | 12/1983 | Japan . |
| 59-17612 | 1/1984 | Japan . |
| 59-160213 | 9/1984 | Japan . |
| 62-26505 | 2/1987 | Japan . |
| 63-23693 | 2/1988 | Japan . |
| 63-271507 | 11/1988 | Japan . |

OTHER PUBLICATIONS

"Commande Et Regulation Par Calculateur Numerique", Claude Foulard, Sylviane Gentil and Jean–Paul Sandraz, Eyrolles, Paris, France, 1987, pp. 33–37.

European Search Report dated Oct. 16, 1996 (4 pages).

Communication dated Nov., 1996 (1 page).

Avana, "Analog Systems", http://www.aacorp.com/analog.html, pp. 1–2, 1997.

(List continued on next page.)

*Primary Examiner*—Emanuel T. Voeltz
*Assistant Examiner*—Cuong H. Nguyen
*Attorney, Agent, or Firm*—Finnegan, Henderson, Farabow, Garrett & Dunner, L.L.P.

[57] ABSTRACT

In a technique of monitoring whether a physical system is normal or abnormal by continuously comparing a phenomenon taking place in the system and a phenomenon taking place in a model and also in a technique of control adopting evaluation functions using an error quantity in the model, the phenomena in both the physical system and model can be optimized. An equivalent electric circuit to the physical system is produced, and an input is provided to both of the system and the circuit. In this state, the output of the physical system and the reference value of the equivalent electric circuit are compared. The use of the equivalent electric circuit permits solving the problem inherent in the prior art that the time necessary for analog-to-digital conversion and numerical calculations is longer than the time of the actual phenomenon and disables real time simulation.

3 Claims, 5 Drawing Sheets

OTHER PUBLICATIONS

Analogy, Inc., "Fund. of Analog & Digital Simulation, Solving for Both Continuous & Discrete Signals", Analogy: Mixed–Signal Book 4, pp. 1–2, 1995.

Partial European Search Report under Rule 46, paragraph 1 of the European Patent Convention dated Jul. 12, 1996 (4 pages).

Communication dated Jul. 30, 1996 (1 page).

SYSTEM FOR AND METHOD OF EQUIVALENT CIRCUIT REFERENCE TYPE CONTROL

BACKGROUND OF THE INVENTION

1. Field of the Invention

This invention relates to techniques of controlling physical systems as the subject of control, such as uniaxial robots, multiaxial robots, crankshaft mechanisms, gear trains, acoustical transducers, acoustical filters, closed U-shape tubes, radiator fins, etc. and, more particularly, to techniques of controlling the output of a physical system through control of the input thereto. For example, the invention concerns the techniques of controlling the output of a uniaxial robot, such as the rotational position, rotational speed and rotational acceleration of a joint of the robot, through control of input current fed to a joint drive motor, controlling the stroke direction force of a crankshaft mechanism through momentum control, controlling the output sound pressure of an acoustical transducer through input sound pressure control, controlling the head level of a closed U-shape tube on one end side thereof through control of pressure applied to the other end side, and controlling the distal end temperature of a radiator fin through root temperature control thereof.

2. Description of the Prior Art

Japanese Laid-Open Patent Publication No. 63-23693 discloses one type of the above techniques. The disclosed technique comprises the steps of analyzing the relation holding between the input to and the output from a physical system as the subject of control, completing a mathematical model of the physical system according to the analyzed relation, carrying out computer simulation of the operation of the physical system concurrently and in parallel to the operation of the physical system by using the mathematical model, comparing the actual output of the physical system and the result of the simulation, and providing the display of abnormality when the compared data are not in accord. This technique permits detection of occurrence of abnormality of some or other type, thus permitting a fail-and-safe process.

However, the computer simulation is carried out digitally and requires analog-to-digital conversion. In addition, the rate of sampling input values is determined in conformity to computer specifications and can not be indiscriminately increased. What is more, the simulation involves calculations which require operations of solving differential equations and/or equations concerning deviations. This process takes considerable time. Moreover, comparison of actual value and calculated value requires digital-to-analog conversion. Due to the requirement of the various times as noted above, frequently, a high speed actual phenomenon can not be followed up by the computer processing. In such a case, the fail-and-safe process is not executed. Particularly, a complicated behavior of a physical system necessitates a considerably long simulation time, thus making real time simulation difficult even at an actual phenomenon speed which is not so high. This problem can not be ignored when actually using a personal computer or like close-at-hand computer.

Besides, it requires great deals of time and labor to establish a mathematical model and complete a simulation program. A further problem is that in computer simulation using a mathematical model, cases of erroneous simulation inevitably result from program bugs or like causes. Therefore, highly reliable fail-and-safe processes can not always be ensured.

SUMMARY OF THE INVENTION

An object of the invention is to solve the problem of the disability of following up an actual phenomenon due to long time involved in the simulation.

Another object of the invention is to solve the problem of the low reliability of simulation.

A further object of the invention is to solve the problem that too much time and labor are required for producing a simulation program.

Figure 1:
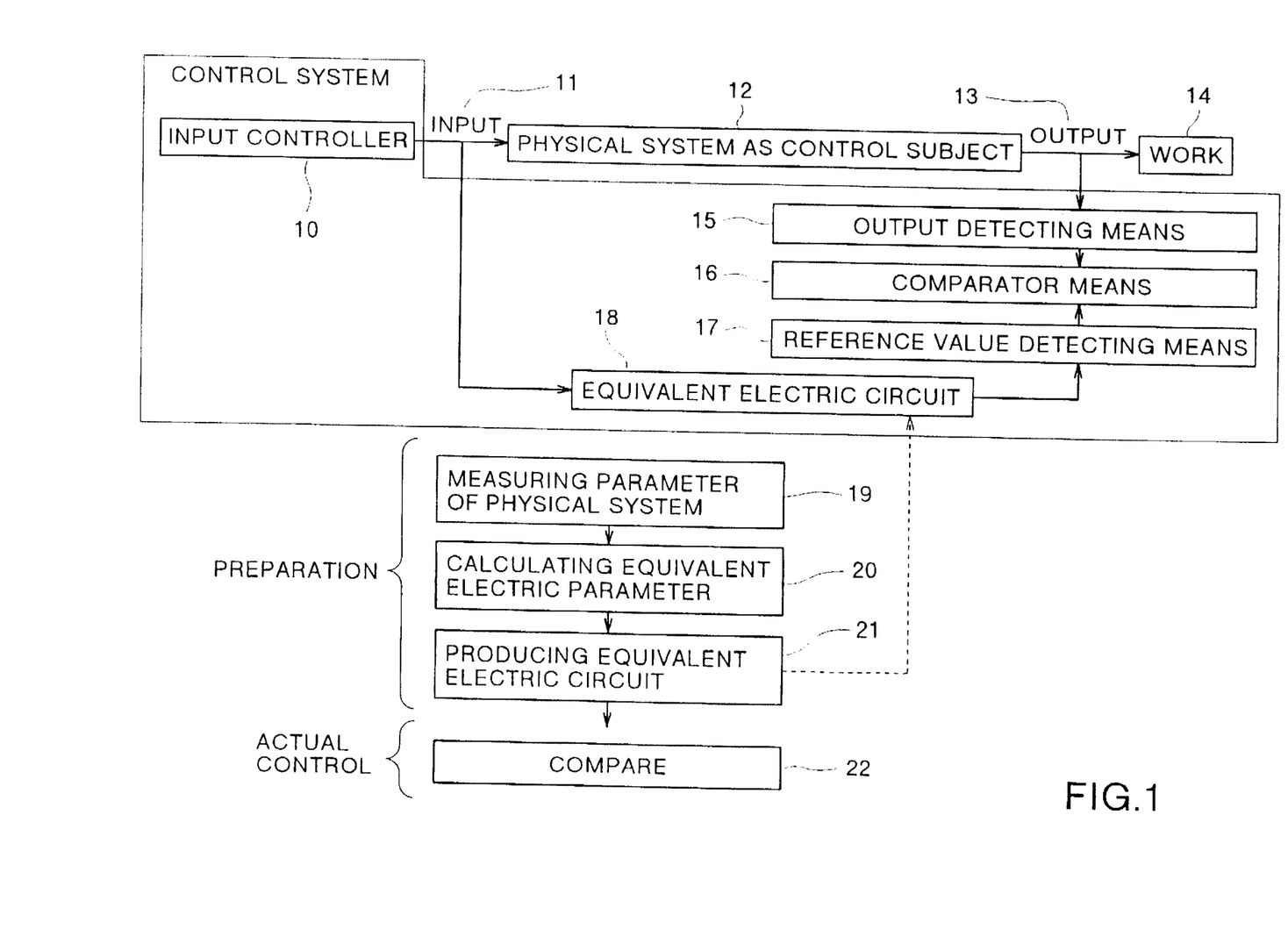
FIG. 1 is a view schematically illustrating the principles underlying the invention.

According to the invention, a control system is provided, which controls the output of a physical system as a subject of control through control of the input to the physical system. The control system, as schematically shown in FIG. 1, comprises an input controller 10 for controlling an input 11 to the physical system 12 as the subject of control, an equivalent electric circuit 18 which is constructed to be equivalent to the physical system 12, output detecting means 15 for detecting the output 13 of the physical system 12 during the presence of the input 11 to the physical system 12, reference value detecting means 17 for detecting a reference value of the equivalent electric circuit 18 during the presence of the input to the equivalent electric circuit 18, and comparator means 16 for comparing the detected value of the output detecting means 15 and the detected value of the reference value detecting means 17.

To the equivalent electric circuit 18 is inputted the same value as inputted to the physical system 12. In the circuit 18, no analog-to-digital conversion process is required. This means that there do not arise the prior art problems that restrictions of the time taken in the analog-to-digital conversion process and input sampling interval may cause time-wise deviation of the input to the physical system 12 and the input in the computer simulation using a mathematical model. The present system does not ignore input value variations in a shorter period than a sampling interval.

According to the invention, in the equivalent electric circuit 18, an equivalent phenomenon to that in the physical system 12 takes place concurrently and in parallel. This permits elimination of the prior art problem that simulation calculations lag behind the actual phenomenon.

A further advantage of the invention is that the output of the physical system 12 is an analog value while the reference value of the equivalent electric circuit 18 is also an analog value. That is, it is necessary only to compare these two analog values, and neither requires analog-to-digital or digital-to-analog conversion.

It is a yet further advantage of the invention that the equivalent electric circuit 18 can be produced easily compared to the production of a mathematical model even when the behavior of the physical system 12 is complicated, thus permitting preclusion of the requirement of long time until completion of the mathematical model.

According to the invention, a control method is also provided. As shown in FIG. 1, the control method is carried out by executing a step 19 of measuring parameters of the physical system by measuring the input to and the output from the physical system a number of times, a step 20 of calculating electric parameters equivalent to the parameters measured in the measuring step, and a step 21 of producing an equivalent electric circuit by using parts which are provided with the calculated electric parameters, executing actual control by inputting the input to the physical system also to the equivalent electric circuit, and executing a step 22 of continuously comparing the output of the physical system and the reference value of the equivalent electric circuit. The steps 19 to 21 are executed in preparation and the step 22 is executed during the actual control.

In this method, the equivalent electric circuit 18 is produced in the steps 19 to 21, and in actual control, both the physical system 12 and equivalent electric circuit 18 are controlled concurrently and in parallel. The result of control is also continuously compared, so that it is possible to obtain real time detection of occurrence of control abnormality or the like.

BRIEF DESCRIPTION OF THE DRAWINGS

The above and other objects, features and advantages of the invention will become more apparent from the following detailed description of the preferred embodiments of the invention when the same is read with reference to the accompanying drawings, in which.

DETAILED DESCRIPTION OF THE PREFERRED EMBODIMENTS

Figure 2:
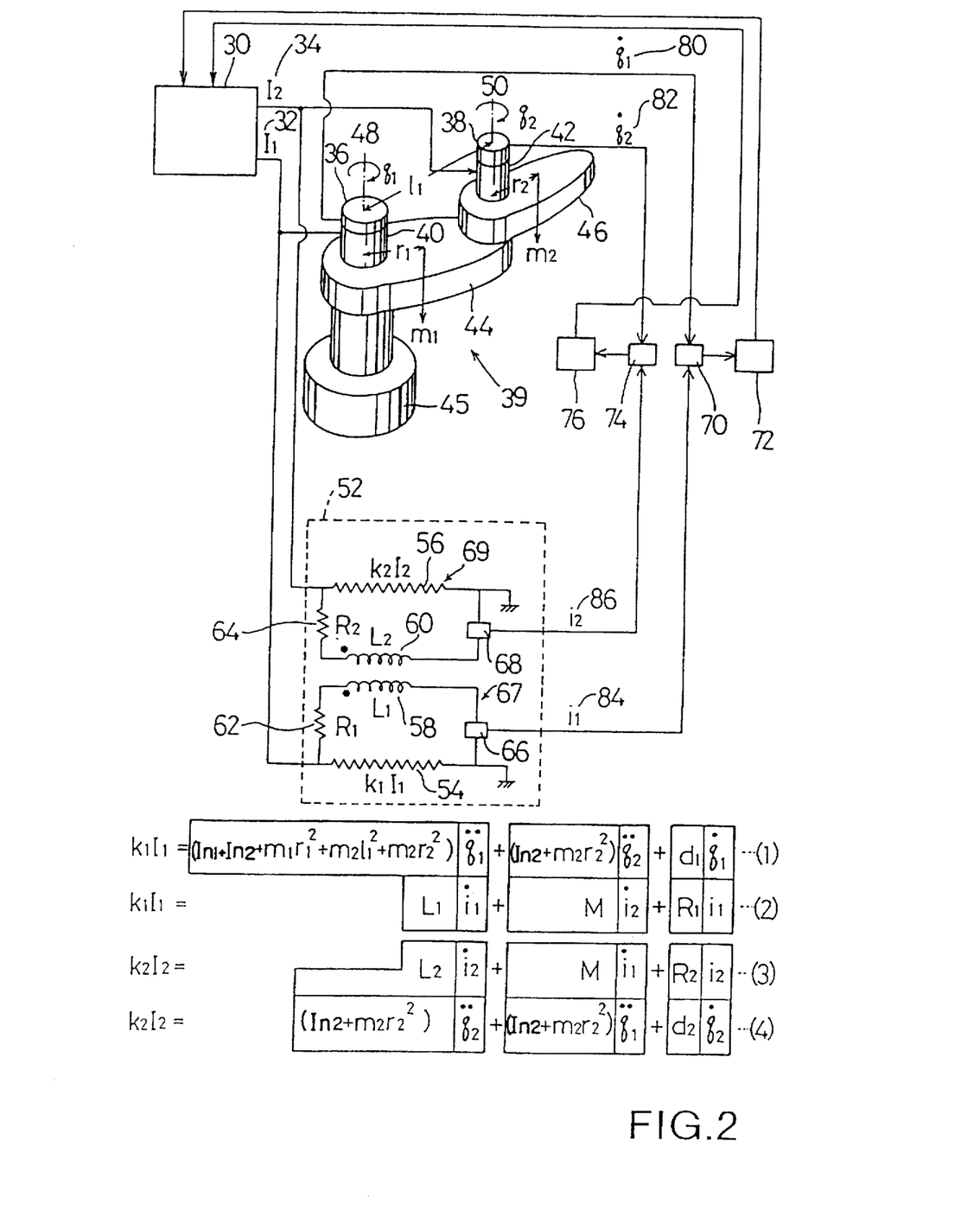
FIG. 2 is a schematic representation of a first embodiment of the invention.

FIG. 2 shows a first embodiment of the invention as applied to a two-axial robot 39. The robot 39 has a base 45 which rotatably supports a first arm 44 around a first axis 48. The rotation angle $q_1$ of the first arm 44 is adjusted by a first motor 40. The first arm 44 has a free end which rotatably supports a second arm 46 around a second axis 50. The rotation angle $q_2$ of the second arm 46 is adjusted by a second motor 42. The first and second motors 40 and 42 respectively generate torques $\tau_1$ and $\tau_2$ which are proportional to input currents $I_1$ and $I_2$ ($\tau_1=k_1 \cdot I_1$, $\tau_2=k_2 \cdot I_2$). The input currents $I_1$ and $I_2$ are controlled by a two-axial controller 30. The two-axial controller 30 controls the input currents $I_1$ and $I_2$ with the lapse of time according to a working program for the robot 39. The robot 39 thus executes such operation as revolution at a low speed, revolution at a high speed or revolution in the reverse direction according to the working program. The two-axial controller 30 comprises a digital computer having a built-in interface and can control analog values of the input currents $I_1$ and $I_2$.

A tachometer generator 36 is provided in the first motor 40, and another tachometer generator 38 is provided in the second motor 42. These tachometer generators 36 and 38 provide outputs 80 and 82 which are proportional in value to the angular speeds of rotation. More specifically, the tachometer generator 36 outputs an analog value which is proportional to the revolution speed of the first arm 44, while the tachometer generator 38 outputs an analog value proportional to the revolution speed of the second arm 46. These analog values proportional to the revolution speeds are inputted to one input terminal of respective operational amplifiers 70 and 74.

The input currents $I_1$ and $I_2$ which are controlled by the two-axial controller 30 are also inputted to an equivalent electric circuit 52. The equivalent electric circuit 52 includes a pair of resistors 54 and 56. A voltage $k_1 \cdot I_1$ proportional to the input current $I_1$ is generated across the resistor 54, while a voltage $k_2 \cdot I_2$ proportional to the input current $I_2$ is generated across the resistor 56. The resistor 54 forms a first closed loop 67 together with a resistor 62 and a coil 58 connected thereto. The resistor 56 forms a second closed loop 69 together with a resistor 64 and a coil 60 connected thereto. The mutual inductance between the coils 58 and 60 is M.

The first closed loop 67 has a first current detector 66 which outputs an analog value 84 proportional to a current $i_1$ in the first loop 67. The second closed loop 69 has a second current detector 68 which outputs an analog value 86 proportional to a current $i_2$ in the second closed loop 69. The value 84 proportional to the current $i_1$ in the first closed loop 67 is inputted to the other input terminal of the operational amplifier 70. Likewise, the value 86 proportional to the current $i_2$ in the second closed loop 69 is inputted to the other input terminal of the operational amplifier 74. The operational amplifier 70 compares the analog value 80 proportional to the revolution speed of the first arm 44 and the analog value 84 proportional to the current $i_1$ in the first closed loop 67, and operates an alarm 72 when the difference between the compared values exceeds a predetermined value. The operational amplifier 74 compares the analog value 82 proportional to the revolution speed of the second arm 46 and the analog value 86 proportional to the current $i_2$ in the second closed loop 69, and operates an alarm 76 when the difference between the compared values exceeds a predetermined value. The alarms 72 and 76 are connected to the two-axial controller 30 which stops the operation of the robot 39 when at least either of the alarms 72 and 76 is operated. As an alternative of stopping the robot 39, it is possible to cause the operational amplifiers 70 and 74 to detect differences and correct the input currents $I_1$ and $I_2$ by the detected differences.

Denoting the mass of the first arm 44 by $m_1$, the distance between the centroid of the first arm 44 and the first axis 48 by $r_1$, the mass of the second arm 46 by $m_2$, the distance between the centroid of the second arm 46 and the second axis 50 by $r_2$, the distance between the first and the second axes 48 and 50 by $l_1$, the moment of inertia of the first arm 44 by $I_1$, the moment of inertia of the second arm 46 by $I_2$, the friction coefficient around the first axis 48 by $d_1$, and the friction coefficient around the second axis 50 by $d_2$, the equation (1) in FIG. 2 concerning the torque $k_1 \cdot I_1$ applied by the first motor 40 is satisfied, and the equation (4) concerning the torque $k_2 \cdot I_2$ applied by the second motor 42 is satisfied. The equations (1) and (4) are approximate functions which are obtained by removing non-linear term from Lagrangean function.

Denoting the resistance of the resistor 62 by $R_1$, the inductance of the coil 58 by $L_1$, the resistance of the resistor 64 by $R_2$, the inductance of the coil 60 by $L_2$, the mutual inductance between the coils 58 and 60 by M, the equation (2) concerning the first closed loop 67 is satisfied, and the equation (3) concerning the second closed loop 69 is satisfied.

As is obvious from the form of the equations (1), (2), (3) and (4), perfect proportionality of the revolution speeds (i.e., single differentials of the rotation angles $q_1$ and $q_2$) and the currents $i_1$ and $i_2$ to one another can be obtained by setting the values of the inductances $L_1$, $L_2$ and M and resistances $R_1$ and $R_2$ to be proportional to the coefficients in the equations (1) and (4). In other words, it is obvious that the behavior of the multiaxial robot 39 as expressed by the equations (1) and (4) and the electrical behavior of the equivalent electric circuit 52 are physically equivalent to each other.

In this embodiment, the angle, speed and acceleration of revolution of the multiaxial robot 39 are preliminarily measured by giving various values of the input currents $I_1$ and $I_2$ to the robot 39. The coefficients in the equations (1) and (4) are obtained from the values of the input current and the output at this time by the least square method. Electric parameters of the coils 58 and 60, resistors 62 and 64, etc. are selected from the coefficients obtained in this way. In this case, the analog values 80 and 84 inputted to the operational amplifier 70 are set to be equal to each other, and also the analog values 82 and 86 inputted to the operational amplifier 74 are set to be equal to each other. It is possible to provide separate operational amplifiers for analog value adjustment. It is well recognized in the art that the behavior occurring in a mechanical system and that occurring in an electric system can be made equivalent to each other.

In the preparation stage, the coefficients (or parameters) in the equations (1) and (4) which describe the motion of the physical system are measured, and the equivalent electric circuit 52 for bringing about an equivalent electric phenomenon is produced. That is, a system shown in the upper half of FIG. 2 is preliminarily built up.

In the actual control, the input currents $I_1$ and $I_2$ are continuously inputted to the equivalent electric circuit 52. During this time, the tachometer generators 36 and 38 continuously detect outputs from the physical system (i.e., revolution speeds) while current detectors 66 and 68 continuously detect reference values (i.e., currents in this case) in the equivalent electric circuit 52. Each of the operational amplifiers 70 and 74 continuously detects the two values inputted thereto.

When no abnormality is produced in the control system, an equivalent phenomenon to that in the physical system is produced in the equivalent electric circuit 52, the two analog values inputted to each of the operational amplifiers 70 and 74 are equal, and neither of the alarms 72 and 76 is operated. When some abnormality occurs, for instance when an obstacle collides with the robot 39 to prevent the scheduled operation, the behavior in the physical system and that in the equivalent electric circuit 52 fails to be in accord with each other. For example, when the movement of the first arm 44 is unexpectedly restricted, the revolution speed of the first arm 44 and the current in the first closed loop 67 are no longer proportional. This results in failure of accord of the levels of the inputs to the first operational amplifier 70, thus causing the alarm 72 to operate. Likewise, when the movement of the second arm 46 is unexpectedly restricted, the revolution speed of the second arm 46 and the current in the second closed loop 69 are no longer proportional, so that the levels of the inputs to the second operational amplifier 74 fails to be in accord, thus causing the alarm 76 to operate.

In this embodiment, as described above, in the actual control, the same input data is given to the physical system and also to the equivalent electric circuit 52 to cause equivalent phenomena concurrently and in parallel. It is thus possible to real time monitor for any abnormality or monitor the operation as scheduled.

In FIG. 2, the phenomena taking place outside the two-axial controller 30 all utilize analog values, and the process of monitoring does not require any analog-to-digital or digital-to-analog conversion. The equivalent electric circuit 52 is an analog circuit, and in this circuit, a behavior equivalent to that in the robot 39 is obtained concurrently and in parallel. In other words, in this embodiment, the concurrence of equivalent phenomena is maintained. Furthermore, in a prior art mathematical model simulation technique, quick change of the input currents $I_1$ and $I_2$ is ignored when the change of the input currents is rapid compared with the sampling rate. In this embodiment, the equivalent electric circuit 52 maintains equivalent behavior to that of the robot 39 even if the input currents $I_1$ and $I_2$ change quickly.

Figure 3:
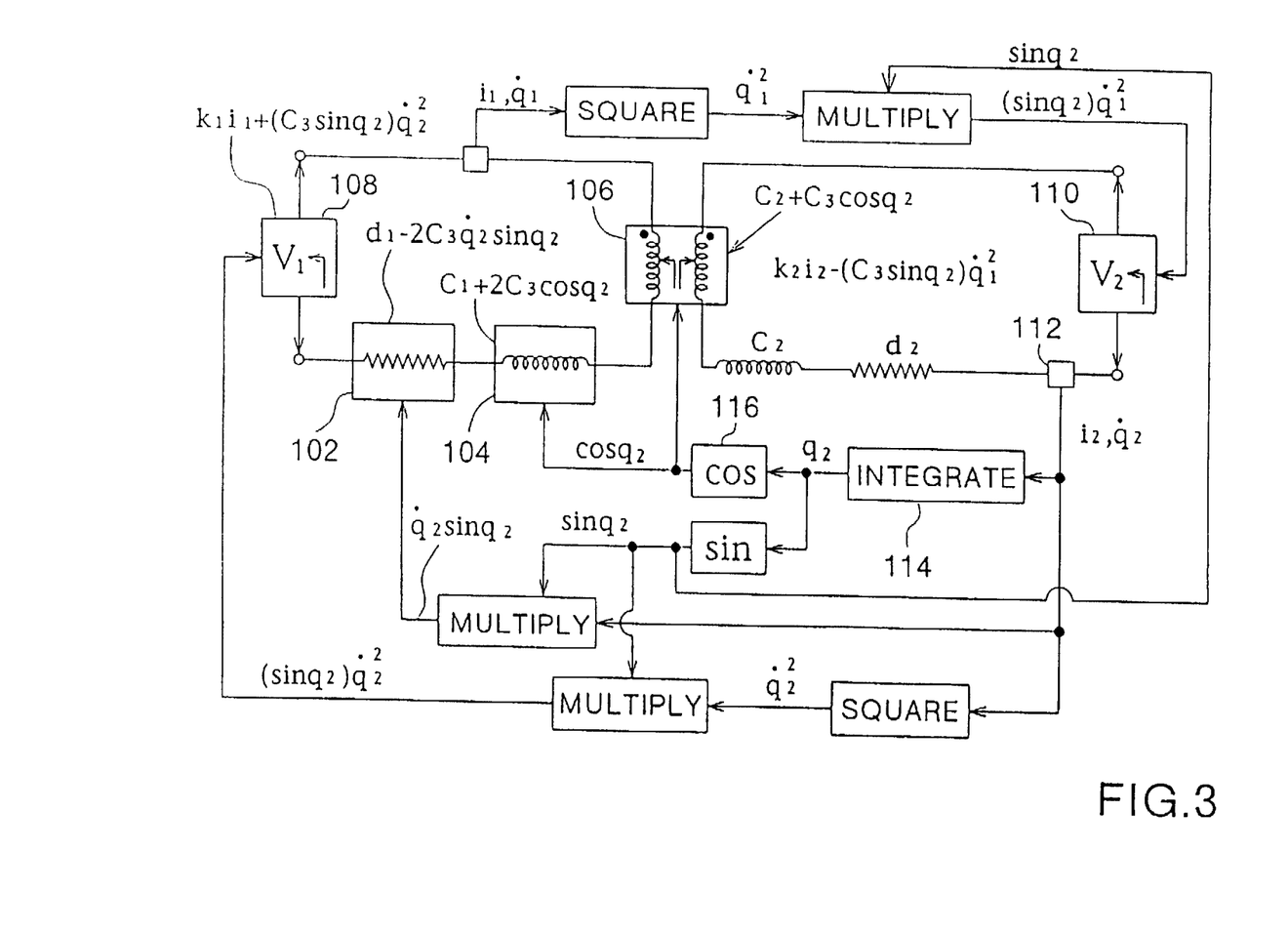
FIG. 3 is a view showing an equivalent electric circuit of a second embodiment of the invention.

As described above, the equations (1) and (4) are approximate functions free from non-linear term. The circuit shown in FIG. 2 shows an approximate equivalent electric circuit in this case, whereas shown in FIG. 3 is an equivalent electric circuit in which non-linear terms as well are taken into consideration. Using coefficients in the equations (5) to (7) among the equations (5) to (13) shown below, the motion around the first axis is given by the equation (8), and the motion around the second axis is given by the equation (9). These equations (8) and (9) of motion contain non-linear terms and reflect influence of Coriolis' force, centrifugal force and posture changes of the robot 39. The equation (10) is a transformation of the equation (8), and the equation (13) is a transformation of the equation (9). The equations (11) and (12) are satisfied with the electric circuit shown in FIG. 3, that is, an electric circuit in which the first loop has electric parameters of the self inductance $L_3$, mutual inductance $M_2$ and resistance $R_3$ and the second loop has parameters of the self inductance $L_4$, mutual inductance $M_2$ and resistance $R_4$.

$$C_1 = I_1 + I_2 + m_1 r_1^2 + m_2 l_1^2 + m_2 r_2^2 \tag{5}$$

$$C_2 = I_2 + m_2 r_2^2 \tag{6}$$

$$C_3 = m_2 l_1 r_2 \tag{7}$$

$$\tau_1 = (C_1 + 2C_3 \cos q_2)\ddot{q}_1 + (C_2 + C_3 \cos q_2)\ddot{q}_2 + (d_1 - 2C_3 \dot{q}_2 \sin q_2)\dot{q}_1 - (C_3 \sin q_2)\dot{q}_2^2 \tag{8}$$

$$\tau_2 = (C_2)\ddot{q}_2 + (C_2 + C_3 \cos q_2)\ddot{q}_1 + (d_2)\dot{q}_2 + (C_3 \sin q_2)\dot{q}_1^2 \tag{9}$$

$$k_1 I_2 + (C_3 \sin q_2)\dot{q}_2^2 = (C_1 + 2C_3 \cos q_2)\ddot{q}_1 + (C_2 + C_3 \cos q_2)\ddot{q}_2 + (d_1 - 2C_3 \dot{q}_2 \sin q_2)\dot{q}_1 \tag{10}$$

$$V_1 = L_3 \dot{i}_1 + M_2 \dot{i}_2 + R_3 i_1 \tag{11}$$

$$V_2 = L_4 \dot{i}_2 + M_2 \dot{i}_1 + R_4 i_2 \tag{12}$$

$$k_2 I_2 - (C_3 \sin q_2)\dot{q}_1^2 = C_2 \ddot{q}_2 + (C_2 + C_3 \cos q_2)\ddot{q}_1 + d_2 i_2 \tag{13}$$

As is obvious, assuming that the coefficients in the equations of motion of the robot are proportional to the coefficients in the electric circuit, the mechanical behavior taking place in the robot and the electrical phenomenon in the electric circuit are equivalent to each other. In this case, the speed of revolution around the first axis and the current $i_1$ in the first loop are equivalent, and the speed of revolution around the second axis and the current $i_2$ in the second loop are equivalent.

In the consideration of the non-linear terms as well, the electric parameters of one of the loops must be varied according to the current in the other loop. To meet this requirement, a reactance transistor is used for the resistor 102 and the coil 104 in the first loop. A reactance transistor is also used for the coil 106 for the mutual inductance. These reactance transistors have properties that their resistance and inductance are varied according to the inputted current. They permit production of an electric circuit, the behavior of which is equivalent to that expressed by the equations (10) and (13), by setting the inputted currents as shown in FIG. 3.

Current-to-voltage transducers 108 and 110 in FIG. 3 control the voltages applied to the first and second loops according to the inputted currents. Current signals for electric parameter control are controlled in the FIG. 3 circuit. A current detector 112 detects the current $i_2$ in the second loop (which is equivalent to the single differential of $q_2$). An integrator 114 integrates the output of the current detector 112. The output of the integrator 114 is inputted to the reactance transistors, so that inductances of the coils 104 and 106 are controlled according to the cosine of the integral of the current in the quadratic circuit. The elements shown as "SQUARE" each output a current corresponding to the square of the input. The elements shown as "MULTIPLY" each multiply two input currents by each other and output the product. The element shown as "sin" outputs the sine of the input. Thus, the coefficients in the equations (10) and (11) can be made proportional to one another, and the coefficients in the equations (12) and (13) can be made proportional to one another. This means that with the FIG. 3 circuit, it is possible to make the robot and the electric circuit to be equivalent to each other.

It is thus possible to make the current $i_1$ in the first loop and the speed of revolution around the first axis to be equivalent to each other and also make the current $i_2$ in the second loop and the speed of revolution around the second axis to be equivalent to each other. By comparing these data by the FIG. 2 operational amplifiers 70 and 74, it is possible to obtain monitoring as to whether the equivalent phenomena are taking place as scheduled or some abnormality is taking place. The FIG. 3 equivalent electric circuit permits closer approximation than the FIG. 2 equivalent electric circuit.

However, as a result of various experiments conducted by the inventor, it was confirmed that the FIG. 2 approximate equivalent circuit, i.e., the circuit 52 which is free from any non-linear term, can produce phenomena which may actually be made equivalent, and that a monitoring process as to whether any abnormality is taking place is possible with an arrangement that the alarms 72 and 76 are not operated when the differences inputted to the operational amplifiers 70 and 74, respectively, are in predetermined ranges.

Figure 4A:
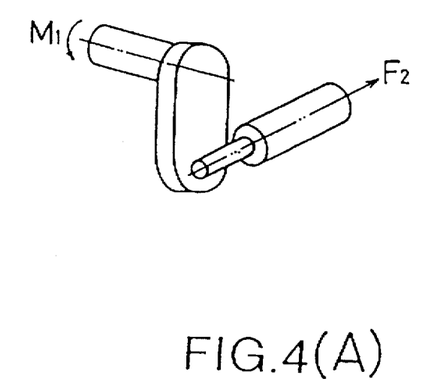
FIGS. 4(A) and 4(B) are views showing a crankshaft mechanism and an equivalent electric circuit therefor, respectively.
Figure 4B:
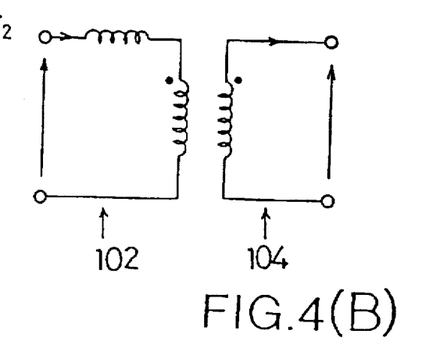

FIGS. 4(A) and 4(B) show a crank mechanism and an equivalent electric circuit therefor, respectively. In this case, by making the voltage applied to the first closed loop 102 to be proportional to the moment $M_1$ of the crankshaft, making the voltage applied to the second closed loop 104 to be proportional to stroke force $F_2$ and making electric parameters of the first and second closed loops 102 and 104 to correspond to mechanical parameters of the crankshaft mechanism, relations can be obtained that the speed or revolution about the crankshaft is equivalent to the current in the first closed loop 102 and that the stroke speed is equivalent to the current in the second closed loop 104. Again in this case, like the FIG. 2 case, it is possible to obtain monitoring as to whether the crankshaft mechanism is normal or abnormal.

Figure 5A:
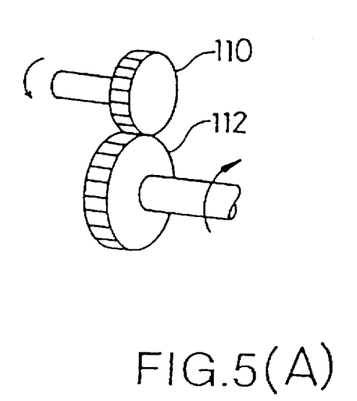
FIGS. 5(A) and 5(B) are views showing a gear train and an equivalent electric circuit therefor, respectively.
Figure 5B:
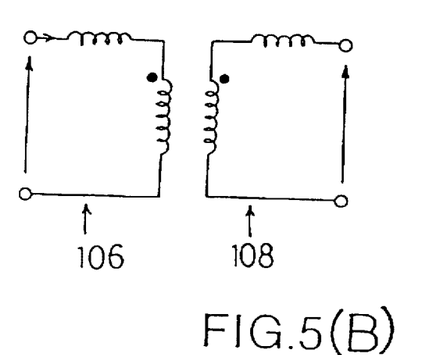

FIGS. 5(A) and 5(B) show a gear train and an equivalent electric circuit therefor, respectively. In this case, by making the voltage applied to the first closed loop 106 to be proportional to the moment of a first gear 110, making the voltage applied to the second closed loop 108 to be proportional to the moment of a second gear 112 and making electric parameters of the first and second closed loops 106 and 108 to correspond to mechanical parameters of the gear train, the speed of revolution of the first gear 110 is made equivalent to the current in the first closed loop 106, and the speed of revolution of the second gear 112 is made equivalent to the current in the second closed loop 108. Again in this case, like the FIG. 2 case, it is possible to obtain monitoring as to whether the gear train is normal or abnormal.

Figure 6A:
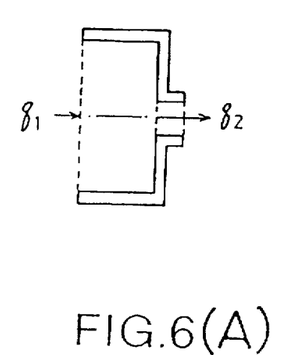
FIGS. 6(A) and 6(B) are views showing an acoustical transducer and an equivalent electric circuit therefor, respectively.
Figure 6B:
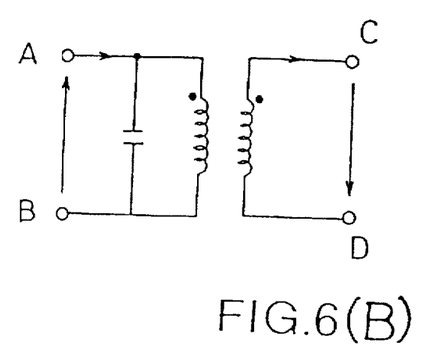

FIGS. 6(A) and 6(B) show an acoustical transducer comprising a large diameter cylinder and a small diameter cylinder and an equivalent electric circuit therefor, respectively. In this case, by setting mechanical parameters of the physical system (i.e., acoustical transducer) to circuit parameters of the equivalent electric circuit and applying a voltage proportional to the sound pressure $q_1$ at the large diameter cylinder inlet between terminals A and B, the sound pressure $q_2$ at the small diameter cylinder outlet can be made equivalent to the voltage between terminals C and D. Again in this case, the phenomenon in the physical system and that in the equivalent electric circuit can be made equivalent. Thus, like the FIG. 2 case, by comparing the two phenomena, it is possible to obtain monitoring as to whether the acoustical transducer is normal or abnormal.

Figure 7A:
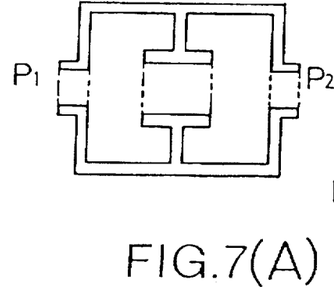
FIGS. 7(A) and 7(B) are views showing an acoustical filter and an equivalent electric circuit therefor, respectively.
Figure 7B:
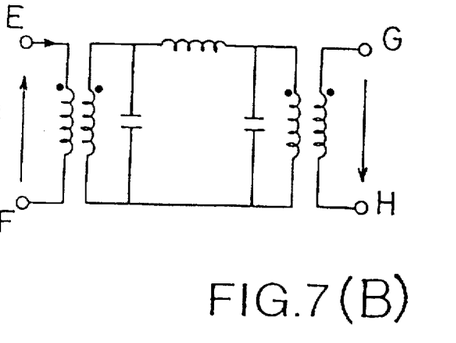

FIGS. 7(A) and 7(B) show an acoustical filter and an equivalent electric circuit therefor, respectively. In this case, by applying a voltage proportional to input sound pressure $P_1$ between terminals E and F, a voltage proportional to an output sound pressure $P_2$ is generated between terminals G and H.

Figure 8A:
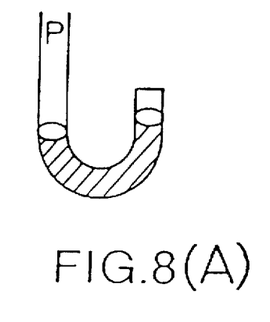
FIGS. 8(A) and 8(B) are views showing a closed U-shape tube and an equivalent electric circuit therefor, respectively.
Figure 8B:
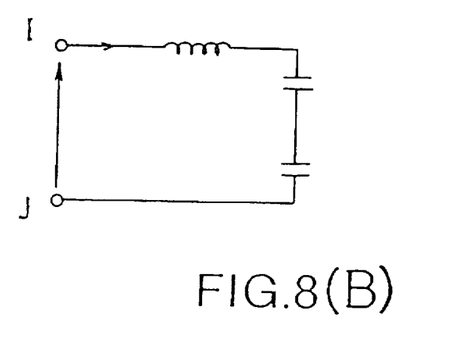

FIGS. 8(A) and 8(B) show a closed U-shape tube and an equivalent electric circuit therefor, respectively. In this case, by applying a voltage proportional to a pressure P applied to one end of the tube between terminals I and J, a current proportional to the head level at the other end of the tube is caused to flow in the circuit.

Figure 9A:
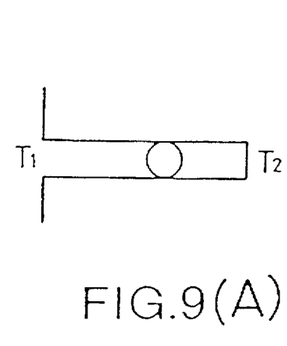
FIGS. 9(A) and 9(B) are views showing a radiator fin and an equivalent electric circuit therefor, respectively.
Figure 9B:
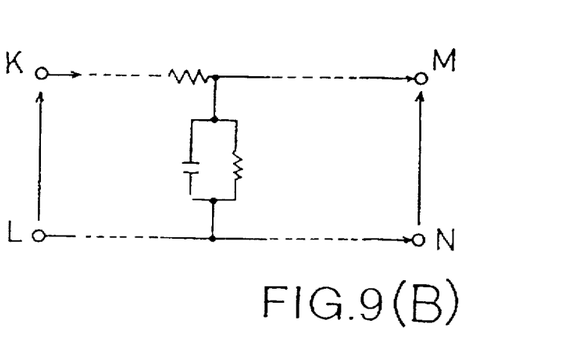

FIGS. 9(A) and 9(B) show a radiator fin and an equivalent circuit therefor, respectively. In this case, by applying a voltage proportional to the root temperature $T_1$ of the fin, a voltage proportional to the distal end temperature $T_2$ of the fin is generated between terminals M and N.

The above examples of the physical system and equivalent electric circuit therefor were introduced in literatures.

According to the invention, equivalent phenomena are produced concurrently in a physical system and an equivalent electric circuit therefor, and it is possible to obtain comparison as to whether the equivalence is maintained, thus permitting real time monitoring of whether or not any abnormality is taking place in the physical system. Besides, it is possible to eliminate time taken in the analog-to-digital conversion, sampling and numerical calculation that are necessary for simulation with a mathematical model, thus eliminating the possibilities of lagging of the simulation behind the actual phenomena and the simulation with input of a different value. According to the invention, it is thus possible to obtain real time monitoring of the behavior of complicated physical systems. Besides, the production of an equivalent electric circuit has a merit that it requires a short time compared to the development of a program of simulation using a mathematical model. Moreover, the reliability can be improved.

While some preferred embodiments of the invention have been described in the foregoing, it is to be understood that changes and modifications may be made in the details of the design without departing from the scope and spirit of the invention as defined in the appended claims.

What is claimed is:

1. A system for equivalent circuit reference type control of the output of a physical system as a subject of control through control of the input to the physical system comprising:

an input controller for controlling the input to the physical system;

an equivalent analog electric circuit equivalent to the physical system;

output detecting means for detecting the output of the physical system while the input to the physical system prevails;

reference value detecting means for detecting a reference value of the equivalent analog electric circuit while the input to the equivalent analog electric circuit prevails; and comparator means for comparing the detected value of the output detecting means and the detected value of the reference value detecting means.

2. A method of equivalent circuit reference type control of the output of a physical system as a subject of control through control of the input to the physical system, comprising:

executing, in a preliminary stage, a step of measuring parameters of the physical system by measuring the input to and the output from the physical system a number of times, a step of calculating electric parameters equivalent to the parameters measured in the parameter measuring step, and a step of producing an equivalent analog electric circuit by using parts with the calculated electric parameters; and executing, in the actual control, a step of inputting the input to the physical system also to the equivalent analog electric circuit to continuously compare, in this state, the output of the physical system and the reference value of the equivalent analog electric circuit.

3. A system for control of a two-axial robot having a base, a first arm mounted on and rotatable relative to the base, a second arm mounted on the free end of and rotatable relative to the first arm, a first motor for rotating the first arm, and a second motor for rotating the second arm, the system comprising:

a first closed loop (67) including a resistor (54) having a grounded terminal, a current proportional to the current ($I_1$) in the first motor being passed through the resistor (54), and a series connection of a resistor (62) and a coil (58), the series connection being connected between the opposite terminals of the resistor (54), a second closed loop (69) including a resistor (56) having a grounded terminal, a current proportional to the current ($I_2$) in the second motor being passed through the resistor (56), and a series connection of a resistor (64) and a coil (60), the series connection being connected between the opposite terminals of the resistor (56);

a first current detector (66) for detecting the current in the first closed loop (67);

a second current detector (68) for detecting the current in the second closed loop (69);

a first tachometer generator (36) for outputting an analog value proportional to the speed of revolution of the first arm;

a second tachometer generator (38) for outputting an analog value proportional to the speed of revolution of the second arm;

a first comparator (70) for comparing the output of the first current detector (66) and the output of the first tachometer generator (36); and a second comparator (74) for comparing the output of the second current detector (68) and the output of the second tachometer generator (38);

wherein the resistance $R_1$ of the resistor (62), the inductance $L_1$ of the coil (58), the resistance $R_2$ of the resistor (64), the inductance $L_2$ of the coil (60) and the mutual inductance M between the coils (58) and (60) are given as $$R_1 = d_1,$$

$$L_1 = In_1 + In_2 + m_1 r_1^2 + m_2 l_1^2 + m_2 r_2^2,$$

$$R_2 = d_2,$$

$$L_2 = In_2 + m_2 r_2^2, \text{ and}$$

$$M = In_2 + m_2 r_2^2,$$

where $d_1$ is a friction coefficient of the first arm, $d_2$ is a friction coefficient of the second arm, $In_1$ is the moment of inertia of the first arm, $In_2$ is the moment of inertia of the second arm, $m_1$ is the mass of the first arm, $m_2$ is the mass of the second arm, $l_1$ is the distance between the center of rotation of the first arm and the center of rotation of the second arm, $r_1$ is the distance between the center of rotation of the first arm and the centroid thereof, and $r_2$ is the distance between the center of rotation of the second arm and the centroid thereof.

* * * * *

UNITED STATES PATENT AND TRADEMARK OFFICE
CERTIFICATE OF CORRECTION

PATENT NO.   : 5,798,919
DATED        : August 25, 1998
INVENTOR(S)  : Kazutsugu SUITA et al.

It is certified that error appears in the above-identified patent and that said Letters Patent is hereby corrected as shown below:

Col. 4, line 53, delete "$I_1$" and substitute therefor --$I_{n1}$--;

line 53, delete "$I_2$" and substitute therefor --$I_{n2}$--.

UNITED STATES PATENT AND TRADEMARK OFFICE
CERTIFICATE OF CORRECTION

PATENT NO. : 5,798,919
DATED : August 25, 1998
INVENTOR(S) : Kazutsugu Suita et al.

It is certified that error appears in the above-identified patent and that said Letters Patent is hereby corrected as shown below:

Col. 6, line 40, equation (5), delete "$I_1$" and substitute therefor --$I_{n1}$--;

line 40, delete "$I_2$" and substitute therefor --$I_{n2}$--;

line 41, equation (6), delete "$I_2$" and substitute therefor --$I_{n2}$--.

Claim 3, Col. 9, line 47, delete "(67)"; before "resistor" insert --first--; delete "(54)";

line 49, before "resistor" insert --first--;

line 50, delete "(54)"; before "resistor" insert --second--; delete "(62)"; before "coil" insert --first--;

line 51, delete "(58)";

line 52, before "resistor" insert --first--; delete "(54)";

Col. 10, line 1, delete "(69)"; before "resistor" insert --third--; delete "(56)";

line 4, before "resistor" (first occurrence) insert --third--; delete "(56)"; before "resistor" (second occurrence) insert --fourth--;

UNITED STATES PATENT AND TRADEMARK OFFICE
CERTIFICATE OF CORRECTION

Page 3 of 4

PATENT NO. : 5,798,919
DATED : August 25, 1998
INVENTOR(S) : Kazutsugu Suita et al.

It is certified that error appears in the above-identified patent and that said Letters Patent is hereby corrected as shown below:

```
line 5, delete "(64)"; before "coil" insert
        --second--; delete "(60)";

line 6, before "resistor" insert --third--;

line 7, delete "(56)";

line 8, delete "(66)";

line 9, delete "(67)";

line 10, delete "(68)";

line 11, delete "(69)";

line 12, delete "(36)";

line 15, delete "(38)";

line 18, delete "(70)";

line 19, delete "(66)";

line 20, delete "(36)";

line 21, delete "(74)";

line 22, delete "(68)";

line 23, delete "(38)";

line 24, before "resistor" insert --second--;
         delete "(62)";
```

UNITED STATES PATENT AND TRADEMARK OFFICE
CERTIFICATE OF CORRECTION

PATENT NO. : 5,798,919
DATED : August 25, 1998
INVENTOR(S) : Kazutsugu Suita et al.

It is certified that error appears in the above-identified patent and that said Letters Patent is hereby corrected as shown below:

line 25, before "coil" insert --first--; delete "(58)"; before "resistor" insert --fourth--;

line 26, delete "(64)"; before "coil" insert --second--; delete "(60)";

line 27, before "coils" insert --first and second--; delete "(58) and (60)".

Signed and Sealed this

Eighth Day of June, 1999

Q. TODD DICKINSON

Attest:

Attesting Officer

Acting Commissioner of Patents and Trademarks